United States Patent
Kuster

(10) Patent No.: US 7,284,499 B1
(45) Date of Patent: Oct. 23, 2007

(54) COMBINATION WATER AND FOOD DISPENSER FOR PETS

(76) Inventor: Laura Kuster, 9405 Eagle Oak Rd., Bakersfield, CA (US) 93311

( * ) Notice: Subject to any disclaimer, the term of this patent is extended or adjusted under 35 U.S.C. 154(b) by 0 days.

(21) Appl. No.: 11/637,502

(22) Filed: Dec. 11, 2006

(51) Int. Cl.
*A01K 5/01* (2006.01)
*A01K 7/00* (2006.01)

(52) U.S. Cl. .................. 119/51.5; 119/61.5; 119/72
(58) Field of Classification Search .......... 119/61.5, 119/61.52, 61.53, 51.5, 61.54, 72, 61.56; D30/121, 129, 130, 132, 133, 127
See application file for complete search history.

(56) References Cited

U.S. PATENT DOCUMENTS

| | | | |
|---|---|---|---|
| 904,584 A * | 11/1908 | Weldon | 119/51.5 |
| 1,552,076 A | 4/1925 | Mosier | |
| 1,682,614 A * | 8/1928 | Guertin | 119/51.5 |
| 2,543,465 A | 2/1951 | Morey | |
| 4,128,080 A | 12/1978 | Haney | |
| 4,651,679 A * | 3/1987 | Fassauer | 119/51.5 |
| 4,735,171 A * | 4/1988 | Essex | 119/51.12 |
| 4,896,627 A * | 1/1990 | Riddell | 119/51.5 |
| 4,953,506 A | 9/1990 | Sanders | |
| 4,966,099 A * | 10/1990 | Arney | 119/61.53 |
| 5,125,363 A | 6/1992 | McGaha | |
| 5,277,149 A | 1/1994 | East | |
| 5,560,315 A | 10/1996 | Lampe | |
| 5,560,316 A | 10/1996 | Lillelund et al. | |
| 5,564,362 A | 10/1996 | Fiveash | |
| D377,243 S | 1/1997 | Fiveash | |
| 5,632,228 A | 5/1997 | Ybarra | |
| 5,794,564 A | 8/1998 | Paro | |
| D497,224 S | 10/2004 | Remy | |
| 2006/0096545 A1 * | 5/2006 | Cone et al. | 119/61.53 |

* cited by examiner

*Primary Examiner*—Son T. Nguyen
(74) *Attorney, Agent, or Firm*—James M. Duncan, Esq.; Klein, DeNatale, Goldner, etc.

(57) ABSTRACT

A water and food dispenser for pets comprises a first dish member and a second dish member, wherein the second dish member is stacked above the first dish member. The first dish member has means for automatically replenishing water within the dish as the water is either consumed or evaporates. The second dish member comprises a food storage reservoir which gravitationally dispenses food into the second dish member. The water and food dispenser may be configured such that the position of the second dish member may be rotated about a vertical axis with respect to the first dish member.

4 Claims, 8 Drawing Sheets

COMBINATION WATER AND FOOD DISPENSER FOR PETS

CROSS-REFERENCE TO RELATED APPLICATIONS

PCT Application PCT/US 06/42476 for this invention was filed on Oct. 30, 2006, which claimed priority to U.S. Provisional Application No. 60/733,356 which was filed on Nov. 3, 2005. The inventor claims domestic priority to these applications.

BACKGROUND OF THE INVENTION

The present invention generally relates to feeding and watering devices for animals. In particular, a combination water and food dispenser is disclosed which provides a pet with fresh food and water. It is known that insects and other pests can crawl into a pet food dish, contaminating the food and making it inedible and/or unappealing to the pet. It is also known that a common problem with combination food and water dispensers is that food particles fall into the water reservoir, contaminating the water.

SUMMARY OF THE INVENTION

The present invention addresses the problems identified above. An embodiment of the apparatus comprises a water dish member (the "first dish member") and a food dish member (the "second dish member"), wherein the water dish member comprises a first wall member enclosing the top surface of the floor member of the water dish and the food dish member comprises a second wall member enclosing the top surface of the floor member of the food dish. The food dish member is disposed above the water dish member, and may be oriented such that the food dish bottom is substantially offset from the water dish bottom—that is, only a small portion of the food dish, if any, is directly above the water dish.

The water dish member comprises a pillar member disposed upon the top surface of the floor member of the dish. The pillar member is bounded by the first wall member, but does not make contact with the first wall member. The pillar member may comprise a single piece, or may comprise a base member and a column member, wherein the pillar member supports the food dish member. An embodiment of the apparatus may further comprise a float valve, the float valve comprising an inlet, an outlet, and a float connected to valve means. Water supply means may be connected to the inlet. The float and the outlet are disposed within the water dish member. The float valve allows the water level in the water dish member to be automatically raised when the water level drops sufficiently in the water dish member, causing the float to drop and the valve means to open.

An embodiment of the apparatus may further comprise a food storage reservoir disposed within the food dish member. The food storage reservoir allows dry food particles to gravitationally fill the food dish member as food is consumed.

DESCRIPTION OF THE EMBODIMENTS OF THE INVENTION

Figure 1:
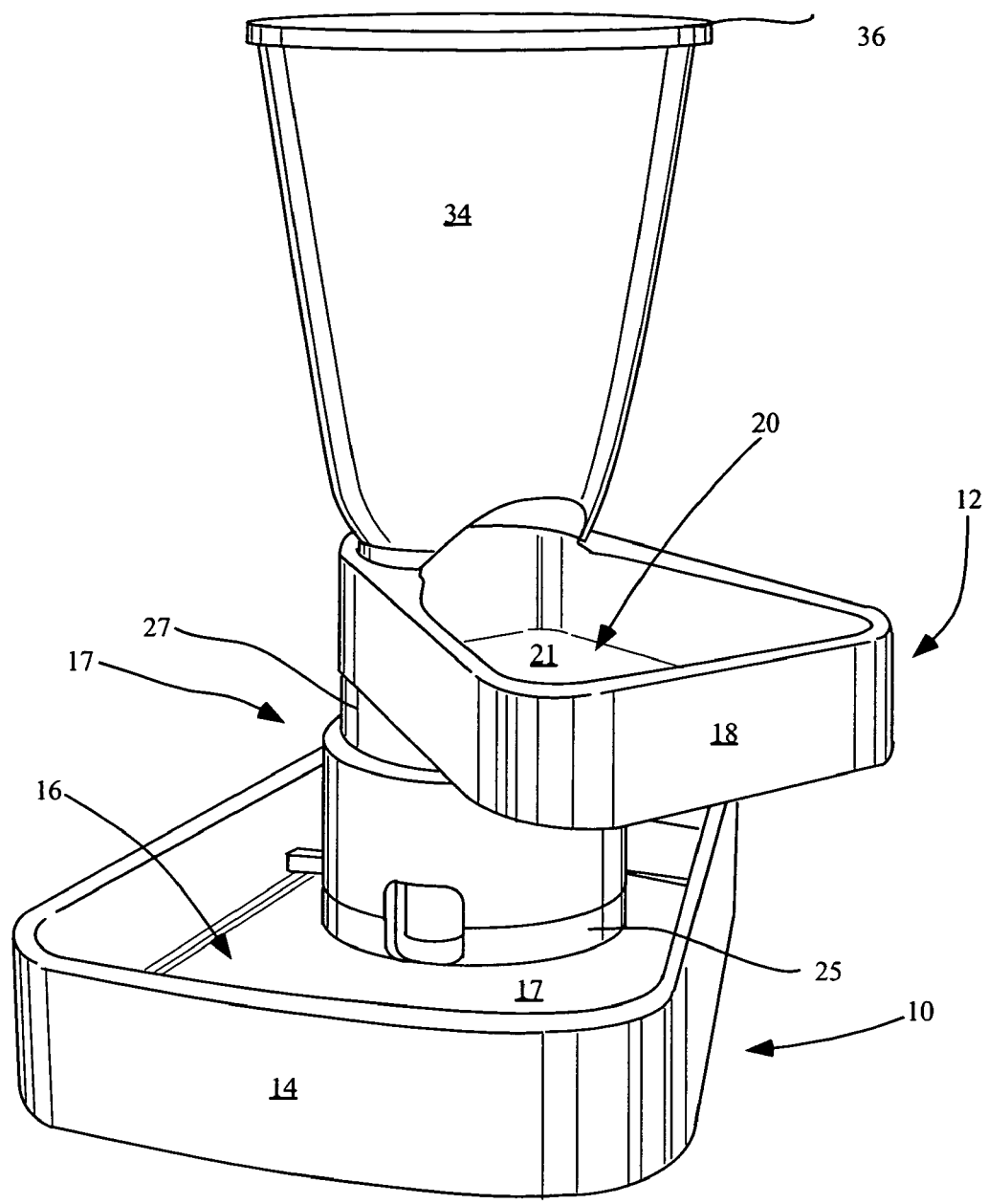
FIG. 1 shows a perspective view of one embodiment of the disclosed invention.

Referring to FIG. 1, an embodiment of the apparatus comprises a first dish member 10 for providing water to a pet and a second dish member 12 for providing food to the pet, where the first dish member and second dish member are disposed in a stacked configuration. The first dish member 10 comprises a first floor 16. The first floor 16 comprises a first top surface 17 and a first bottom surface 19. First wall member 14 encloses the first top surface 17 of the first dish member 10. The second dish member 12 comprises a second floor 20. The second floor 20 comprises a second top surface 21 and a second bottom surface 23. A second wall member 18 encloses the top surface 21.

The first dish member 10 further comprises an upwardly extending pillar member 22 affixed to the first top surface 17. The pillar member 22 may comprise a single piece which connects first dish member 10 to second dish member 12, and maintains these members in vertical spaced apart relation with one another. Alternatively, pillar member 22 may comprise a plurality of sections including base member 25 and column member 27. The base member 25 is adapted to receive column member 27, wherein the column member supports the second dish member 12. Column member 27 may attach to base member 25 via friction fit or other known means of attachment, such that second dish member 12 and column member 27 are removable, facilitating cleaning of the various components of the apparatus. The top of the column member 27 is adapted to attach to the second bottom surface 23 of the second dish member 12.

Figure 9:
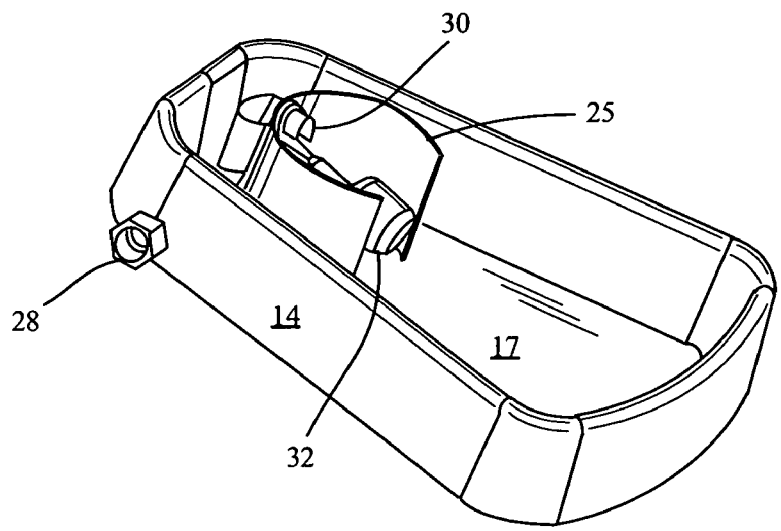
FIG. 9 is a perspective view of the device as shown in FIG. 8.

The base member 25 may comprise an arcuate wall member as shown in FIGS. 9-9. The bottom of column member 27 may attach to base member 25 via friction fit or other known means of attachment. Base member 25 and column member 27 may be so oriented as to define a vertical axis As shown in the various figures, the second dish member 12 may be disposed above the first dish member 10 in such a way that the second dish is substantially offset from the first dish about the vertical axis defined by the base member 25 and the column member 27. The friction attachment of base member 25 and column member 27 to one another enables the user to adjust the offset between first dish member 10 and second dish member 12 as desired. This feature of the device allows the user to orient the respect dish members in such a manner as to prevent or reduce food from falling from second dish member 12 into water which may be stored in first dish member 10. This feature also provides easier access to the first dish 10 by the pet, because second dish member 12 is not blocking access to first dish member 10.

As shown in the figures, the first dish member 10 and the second dish member 12 may generally comprise the same shape. However, the first dish member 10 may be sized larger than the second dish member 12 to increase the stability of the device. The first dish member 10 and second dish member 12 may comprise a variety of shapes, including the trapezoidal shapes shown in the figures.

Pillar member 22 is peripherally bound by the first wall member 14, but does not make contact with the first wall member. This feature of the device causes a "moat" to be formed around the pillar member 22 by the remainder of the first dish member 10, such that water contained within the dish member will prevent or discourage pests from gaining access to pillar member 22. As shown by the Figures, the only access crawling insects have to the food dish member 12 is by crawling up pillar member 22, and this access is precluded by the water contained within the first dish member 10.

The apparatus may further comprise means for replenishing the water in first dish member 10. For example, a bottle reservoir may be attached to the first dish member 10, wherein the bottle reservoir is inverted, and the mouth of the bottle set at the desired water level line within the first dish member 10. As the water level in the first dish member 10 drops, water gravitates from the bottle into the first dish member 10. The bottle reservoir may be stored within the upwardly extending pillar member 22.

Figure 6:
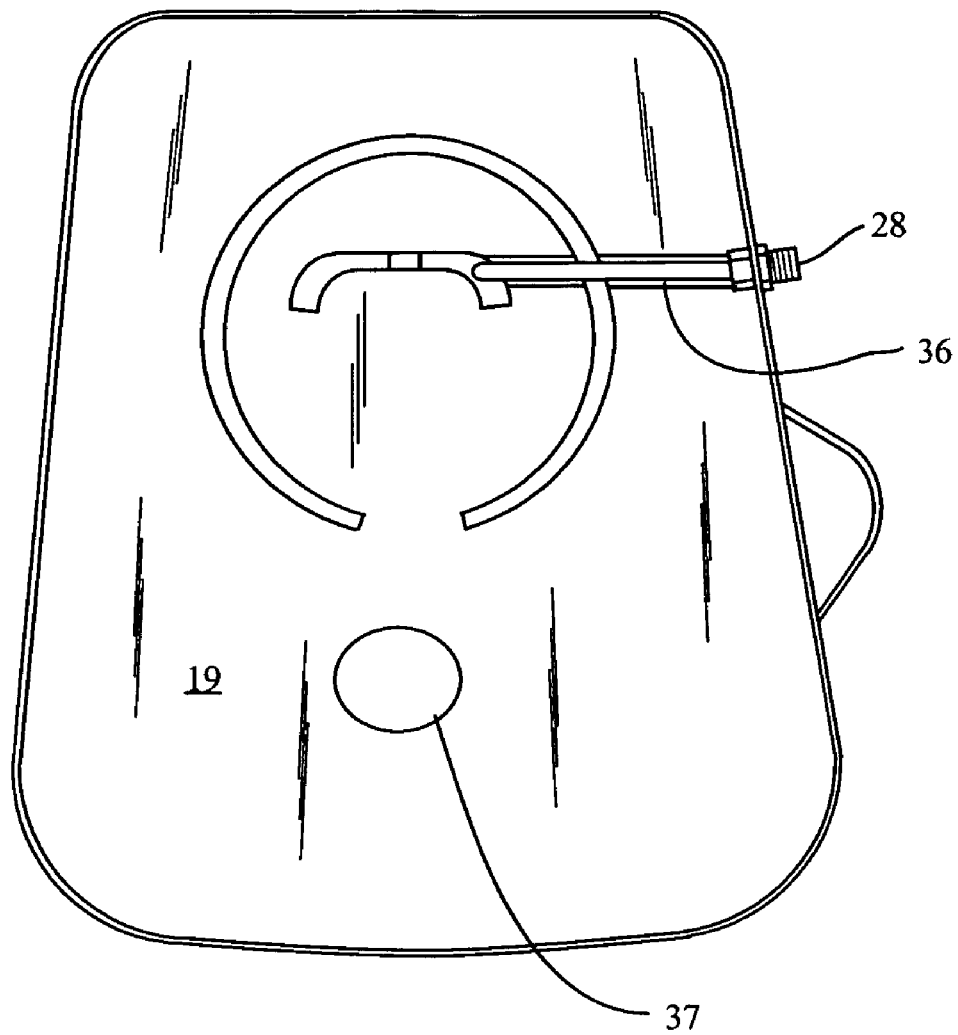
FIG. 6 shows a bottom view the embodiment shown in FIG. 1.
Figure 7:
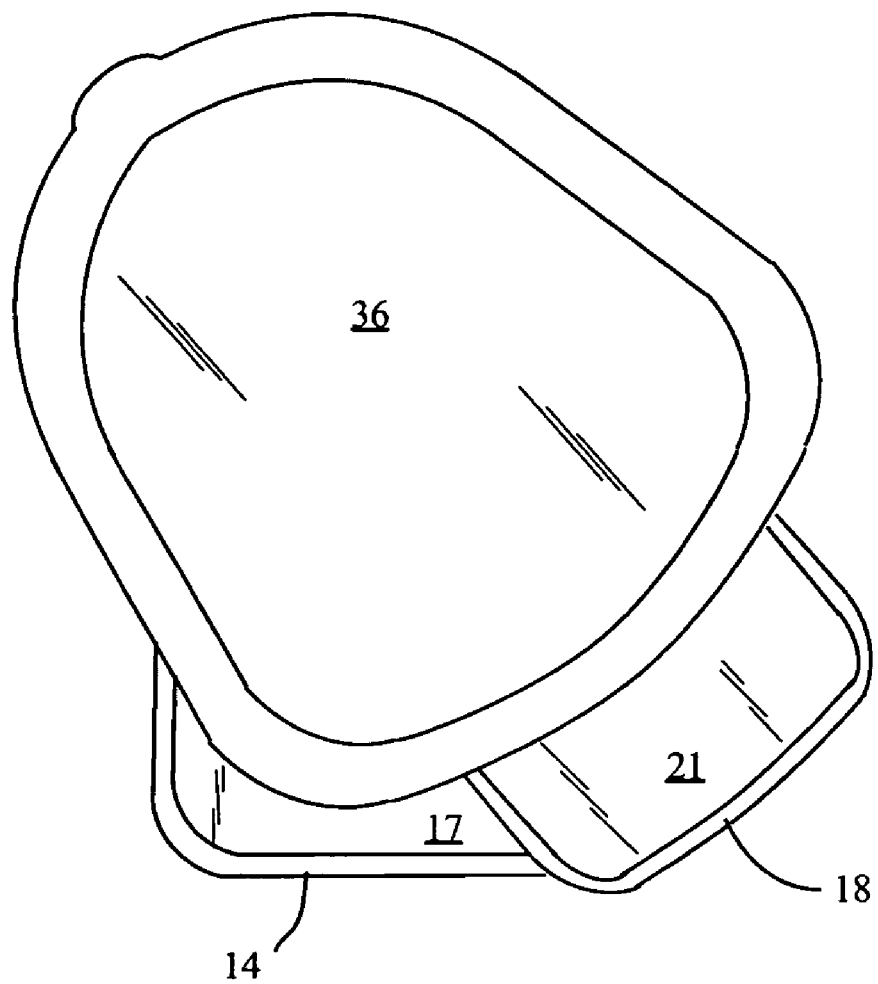
FIG. 7 shows a to view of the embodiment shown in FIG. 1.
Figure 8:
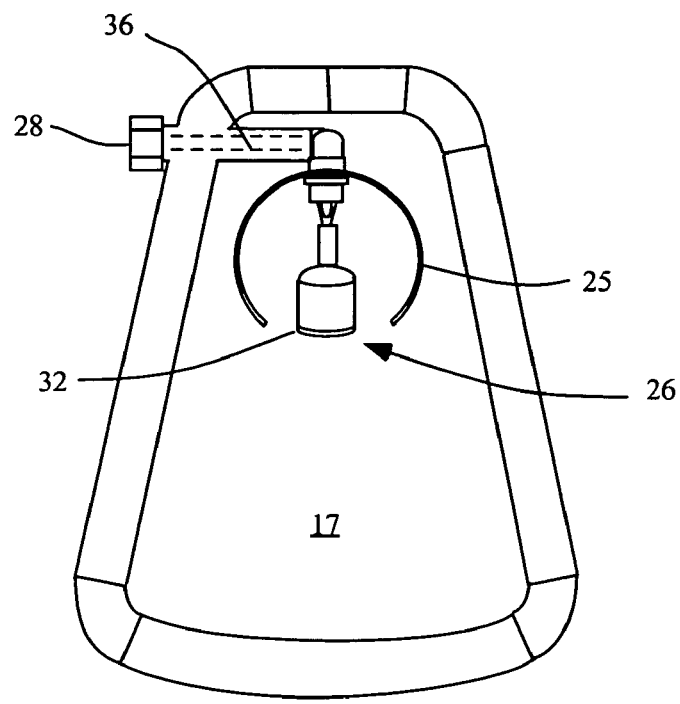
FIG. 8 shows how a top view of the device with the second dish member removed to show how a float valve may be set within the pillar member in an embodiment of the apparatus.

Alternatively, as shown in FIGS. 8-9, the means for replenishing the water in the first dish member 10 may comprise a float valve apparatus 26. The float valve 26 comprises an inlet 28, an outlet 30, and a float 32 connected to valve means. Water supply means may be connected to the inlet 28. The float 32 and the outlet 30 are disposed within the water dish member 10. The float valve 26 allows the water level in the water dish member 10 to be automatically raised when the water level drops sufficiently in the water dish member, causing the float 32 to drop and the valve means to open. As shown in FIGS. 8-9, components of the float valve 26 may be disposed within base member 25 of the pillar member 22. It is to be appreciated that the conduit 36 providing water to the float valve may be configured in such a way that it does not provide a "bridge" to the pillar member 22. This may be accomplished by configuring conduit 36 in such a manner that it will be kept submerged in the first dish member 10 below the minimum water level as adjusted by the float valve 26. Conduit 36 may be configured to be placed in the first bottom surface 19 of first floor 16 as shown in FIG. 6. Conduit 36 may also comprise an integral part of first floor 16.

As also shown in FIG. 6, the apparatus may also comprise a thermostatically controlled heating element 37 which prevents the water in first water dish member from freezing. Heating element 37 is battery operated to prevent any risk of harm to the pet.

Figure 2:
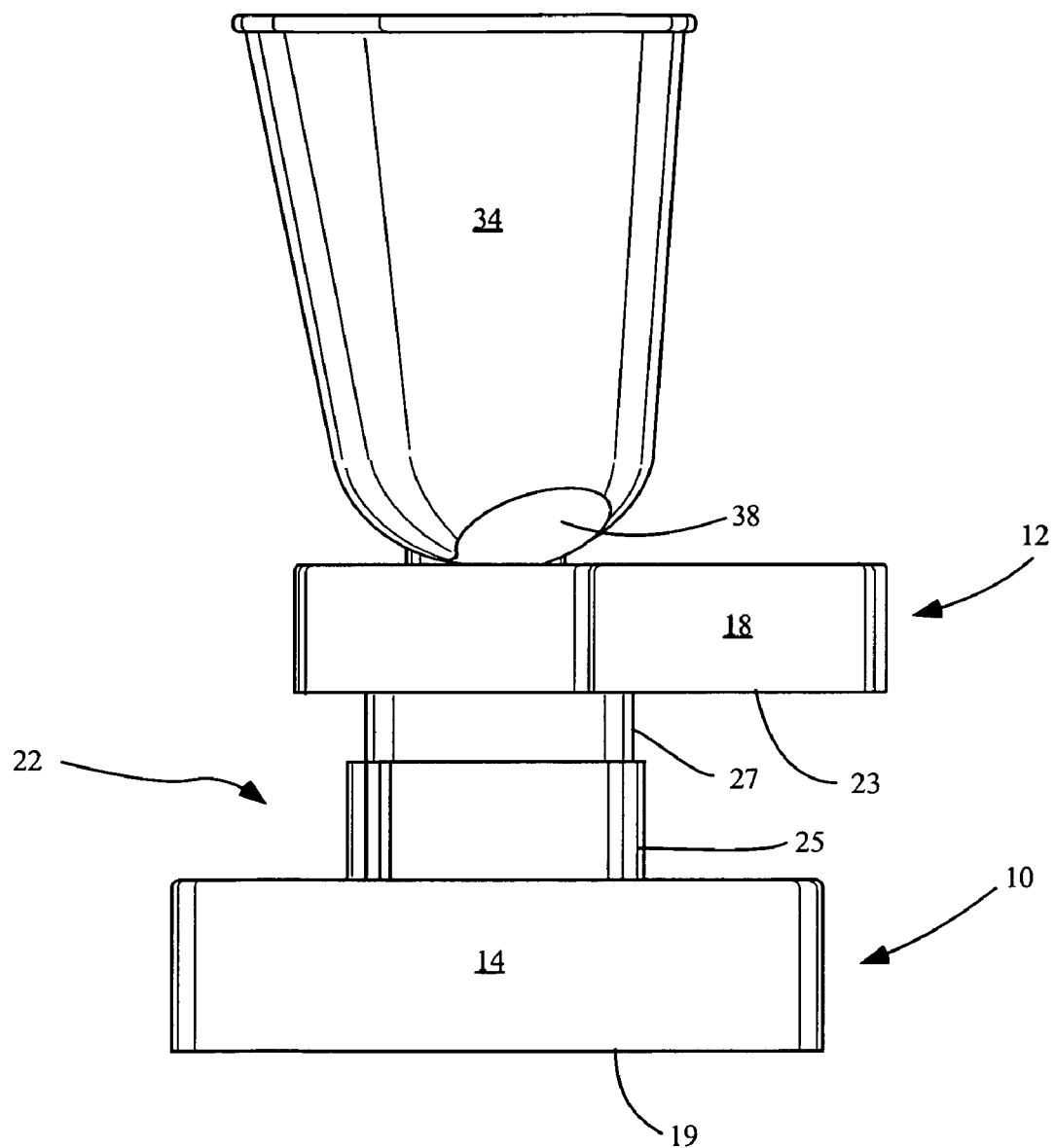
FIG. 2 shows a front view of the embodiment shown in FIG. 1.
Figure 3:
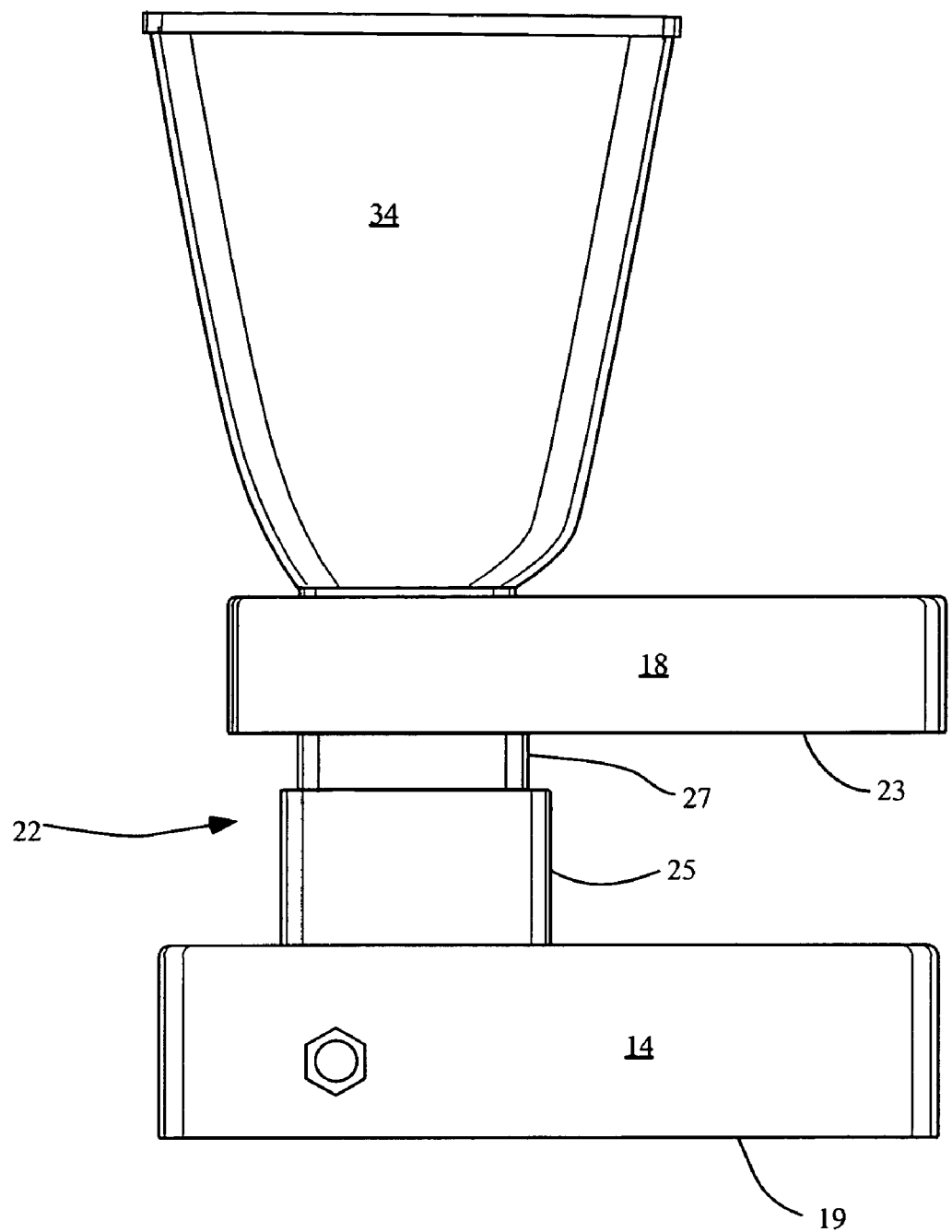
FIG. 3 shows a right side view of the embodiment shown in FIG. 1
Figure 4:
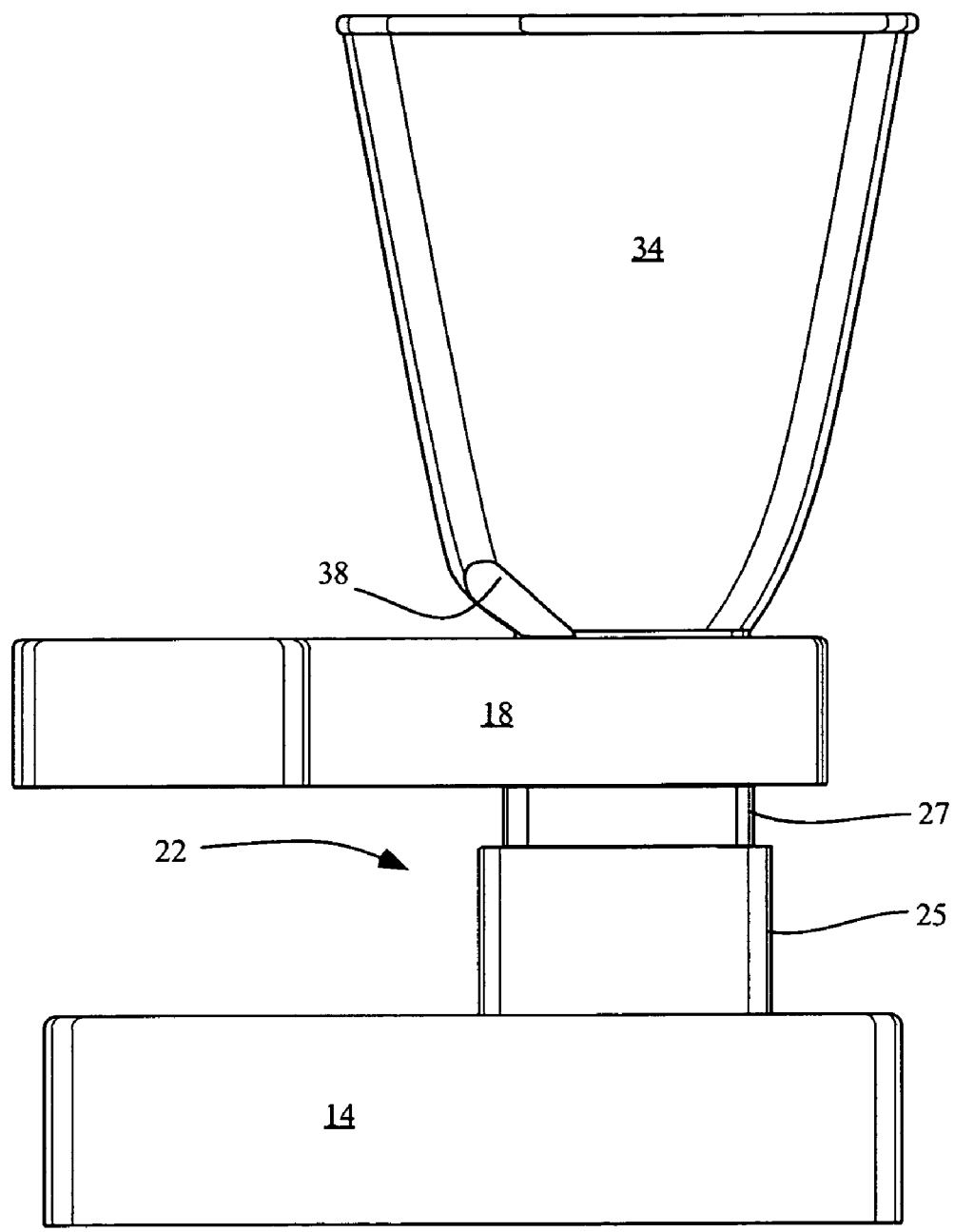
FIG. 4 shows a left side view of the embodiment shown in FIG. 1.
Figure 5:
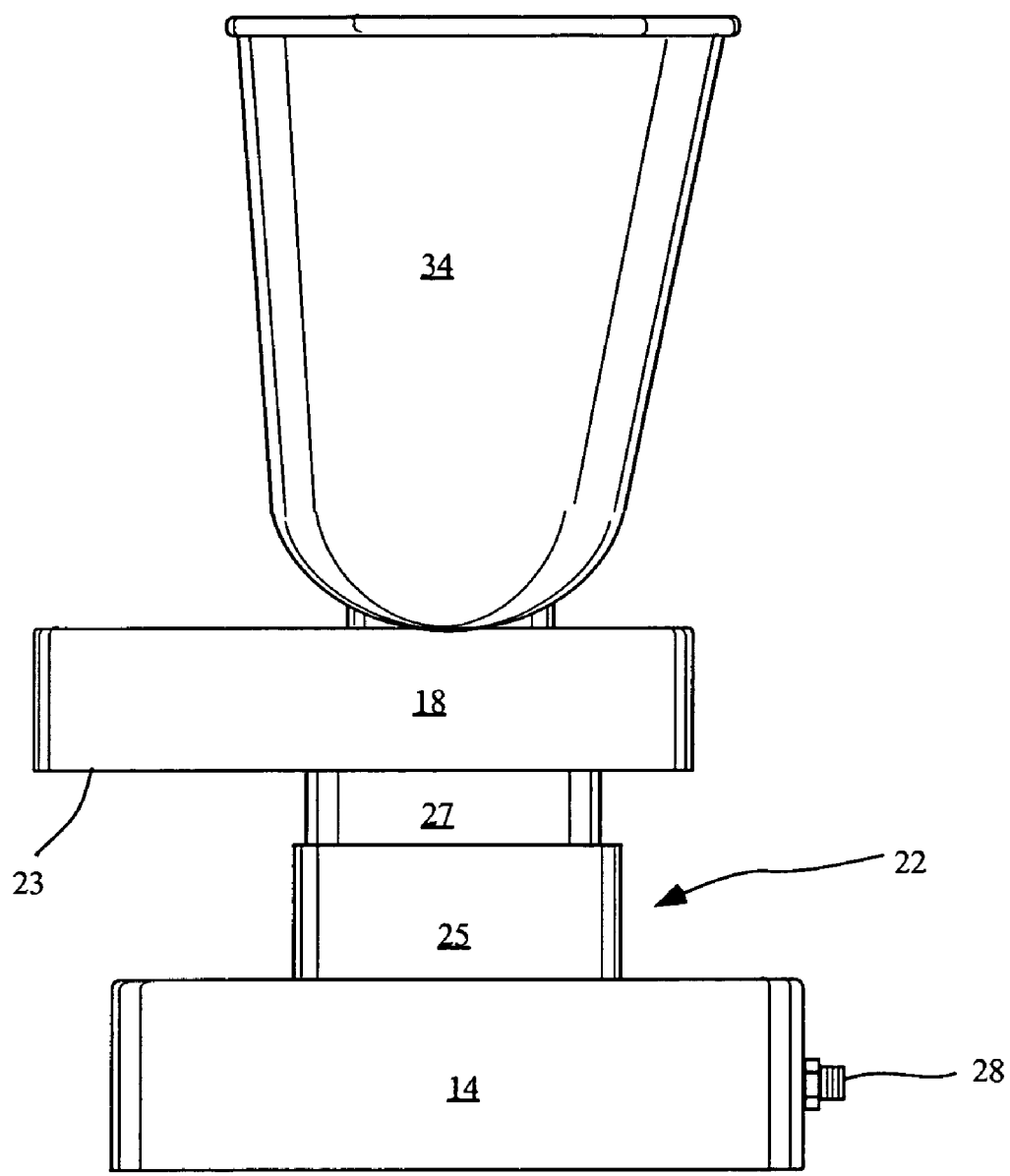
FIG. 5 shows a rear view the embodiment shown in FIG. 1.

An embodiment of the apparatus may further comprise a food storage reservoir 34 disposed within the food dish member 12. The food storage reservoir 34 allows dry food particles to gravitationally fill the food dish member 12 as food is consumed. It is to be appreciated that while food storage reservoir 34 is shown in FIGS. 1-2 as generally funnel shaped, it may be configured in many different shapes. Additional, food storage reservoir 34 may further comprise a top member 36 which covers the food contained within the reservoir. The top member may be configured to either be completely removable, or to attach to the food storage reservoir with pivoting attachment means. Food storage reservoir 34 comprises an opening 38 which allows food contained within the food storage reservoir to gravitate into the food dish member 12 as the food level in the dish member drops as the food is consumed.

Many of the components of the apparatus, including the first dish member 10, second dish member 12, pillar member 22, and food storage reservoir 34, may be fabricated from molded high impact plastic.

While the above is a description of various embodiments of the present invention, further modifications may be employed without departing from the spirit and scope of the present invention. Thus the scope of the invention should not be limited according to these factors, but according to the claims to be filed in the forthcoming utility application.

What is claimed is:

1. A water and food dispenser for pets comprising:
a first dish member comprising a first floor, the first floor having a first top surface and a first bottom surface, the first dish member further comprising a first wall member bounding the first top surface;
an upwardly extending hollow base member affixed to the first top surface;
a column member attached to the base member;
a second dish member comprising a second floor, the second floor having a second top surface and a second bottom surface, the second dish member further comprising a second wall member bounding the second top surface, the column member attached to the second bottom surface, the column member maintaining the second dish member and the first dish member in vertical spaced apart relation;
a dry food storage container affixed to the second top surface, the dry food storage container extending upwardly from the second top surface, the dry food storage container comprising an aperture for gravitationally dispensing dry food into the second dish member;
a water supply conduit extending from the first wall member to the base member; and
a float valve contained within the base member, the float valve controlling the flow of water from the water supply conduit into the first dish member.

2. The water and food dispenser of claim 1 wherein the second dish member is offset from the first dish member.

3. The water and food dispenser of claim 1 wherein the base member comprises an arcuate wall member.

4. The water and food dispenser of claim 1 wherein the water supply conduit is an integral part of the first floor.

* * * * *